Oct. 25, 1955 — W. J. KROPP — 2,721,767
INSULATION BLOWER
Filed April 6, 1953 — 2 Sheets-Sheet 1
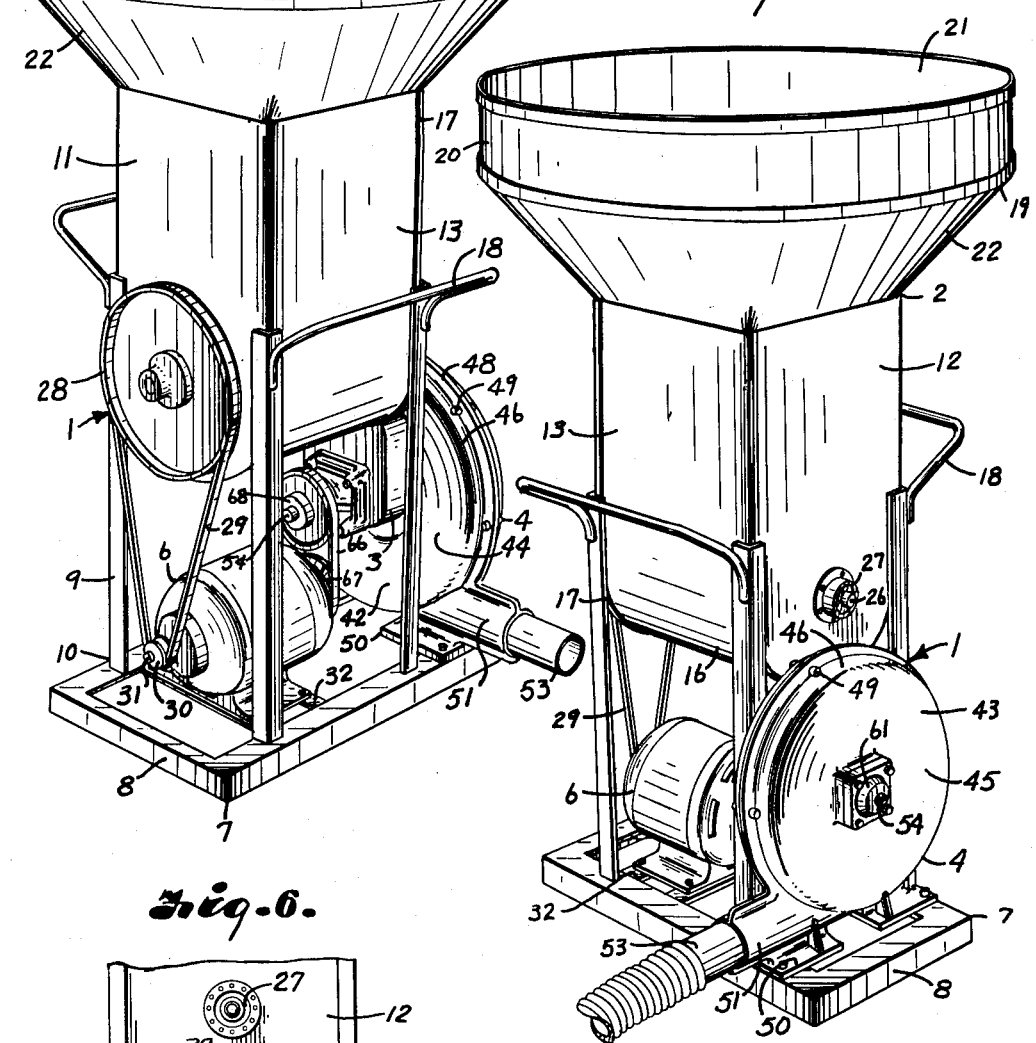
INVENTOR.
William J. Kropp.
BY
Fishburn + Mullendore
ATTORNEYS.

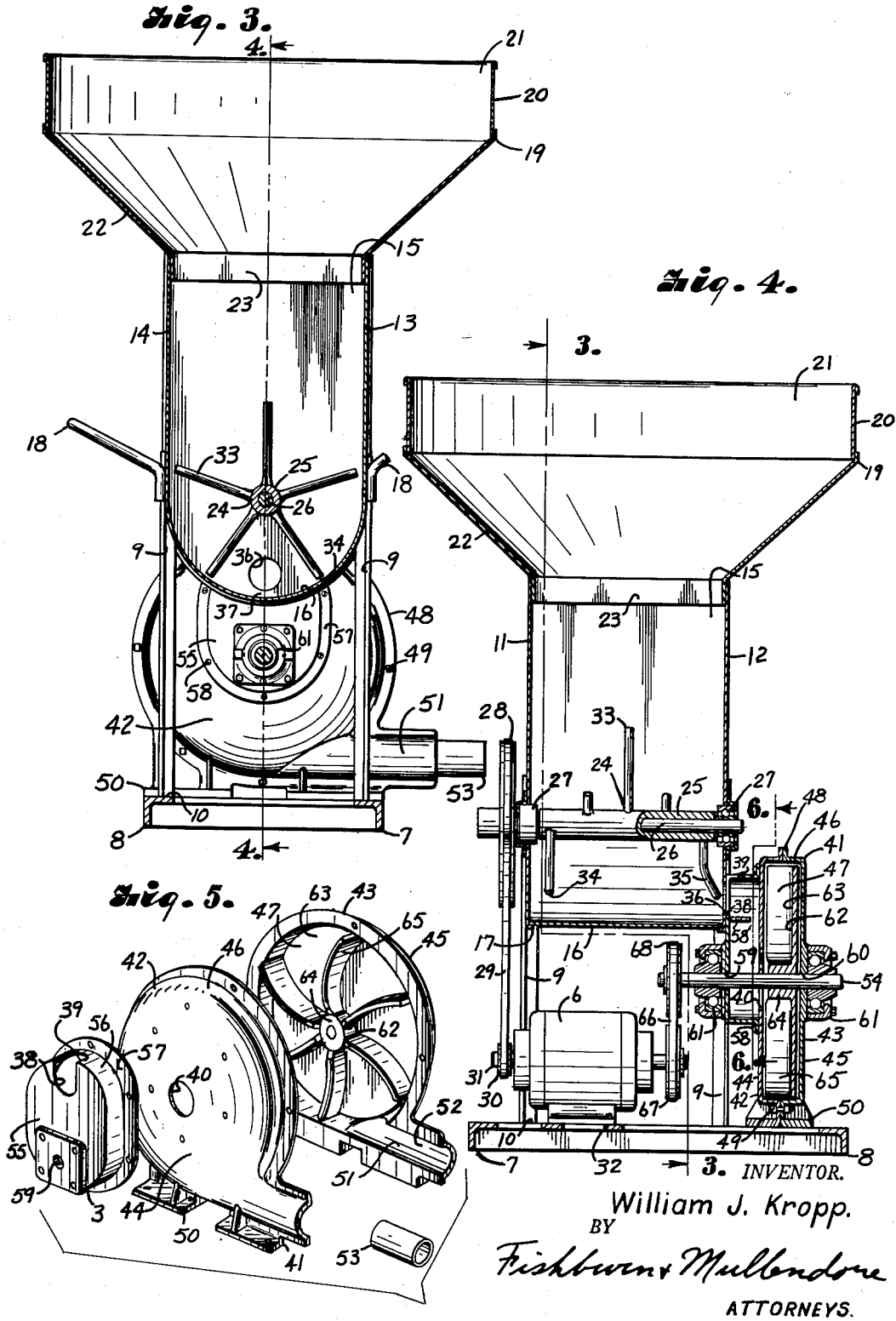

United States Patent Office 2,721,767
Patented Oct. 25, 1955

2,721,767

INSULATION BLOWER

William J. Kropp, Wichita, Kans.

Application April 6, 1953, Serial No. 347,108

3 Claims. (Cl. 302—37)

This invention relates to insulation blowers and more particularly to a machine for receiving fibrous insulation and moving same with an air stream into walls and the like of buildings for reducing passage of the heat therethrough.

The objects of the invention are to provide a machine for installing loose fiber insulation wherein the insulation is agitated, drawn with air through a mixing chamber to substantially suspend the insulation in an air stream for movement by an impeller through a hose or duct to the desired location of said insulation; to provide such an insulation blower with an agitator in a hopper for separating insulation fibers and in relation to the hopper outlet and mixing chamber air inlet, whereby the insulation is moved sufficiently near the outlet to be drawn into the air stream in the mixing chamber; to provide a rotating impeller in a housing associated with the mixing chamber for receiving the air suspended insulation and discharging same through a hose of substantial length to elevate the insulation into a building; to provide outlets in the hopper and mixing chamber above the bottoms thereof whereby heavy foreign objects falling to said bottoms are trapped and do not pass into the impeller housing; and to provide a light weight portable insulation blower that is economical to manufacture and efficient in operation.

In accomplishing these and other objects of the present invention I have provided improved details of structure, the preferred forms of which are illustrated in the accompanying drawings, wherein:

Fig. 1 is a perspective view of an insulation blower embodying the features of the present invention.

Fig. 2 is a perspective view of the insulation blower from the impeller side thereof.

Fig. 3 is a vertical sectional view through the insulation blower on a line 3—3, Fig. 4.

Fig. 4 is a vertical sectional view through the insulation blower on a line 4—4, Fig. 3.

Fig. 5 is a perspective view of the mixing chamber, impeller, and impeller housing in spaced disassembled relation.

Fig. 6 is a vertical sectional view through the mixing chamber on the line 6—6, Fig. 4.

Referring more in detail to the drawings:

1 designates an insulation blower generally consisting of a hopper 2, a mixing chamber 3 arranged to receive fibrous insulation from the hopper, and an impeller apparatus 4 which receives the insulation material from the mixing chamber and moves it through a hose or duct 5 to a desired place of installation.

In the structure illustrated, the hopper, impeller apparatus and driving mechanism, such as an electric motor 6, are preferably supported on a base 7, which in the illustrated structure is formed of structural shapes such as angle-irons 8, welded or otherwise secured together in a substantially rectangular form.

The hopper 2 is supported on a plurality of upwardly extending spaced legs 9, the lower ends of which are suitably secured to the base 7, as at 10. The hopper 2 is preferably formed of sheet metal and has end walls 11 and 12 and side walls 13 and 14 with the edges of said walls suitably connected to form a rectangular open top 15. The lower ends of the side walls 13 and 14 merge in a semi-cylindrical bottom 16, the axis of which is arranged longitudinally of the base 7. The lower portions of the end walls 11 and 12 are arcuate in shape corresponding to the curvature of the bottom 16.

In the illustrated structure the edges of the end walls 11 and 12 are turned inwardly to form flanges 17 which overlie and are suitably secured, as by welding to the side walls 13 and 14 and bottom 16 and the corners of the hopper structure are suitably secured to the upper portions of the legs 9, whereby the hopper is supported in vertically spaced relation to the base 7. Rods bent to form handles 18 are secured to the legs 9 adjacent the upper ends thereof to facilitate carrying and moving the blower structure.

In order to provide increased capacity to the hopper, a hopper extension 19 is removably mounted on the upper end of the hopper 2. The hopper extension has vertically arranged walls 20 defining a cross sectional area substantially larger than the cross sectional area of the hopper 2. The wall 20 is illustrated as defining a cylindrical shape, however, it may be square or other suitable geometric shape, with an open top 21. Secured to the lower ends of the side wall 20 are inwardly and downwardly sloping walls 22 which terminate in a depending flange 23 extending into the open top of the hopper 2. The flange 23 engages the inner surfaces of the side and end walls thereof to support the hopper extension on the hopper and is separable therefrom for facilitating transportation of the apparatus.

An agitator 24 is rotatably mounted in the hopper axially of the bottom 16 thereof. The agitator consists of a sleeve 25, fixed to a shaft 26 which is rotatably mounted in anti-friction bearings 27, preferably of the self-oiled enclosed or dust proof type. The bearings 27 are suitably mounted in the end walls 11 and 12 axially of the bottom 16. The shaft 26 extends through the bearing in the wall 11 and has a pulley 28 fixed on the end thereof exteriorly of the hopper 2. The pulley 28 is operatively connected by a belt 29 with a drive pulley 30 on the armature shaft 31 of the motor 6, which motor is mounted on cross members 32 of the base 7 under the hopper 2.

The agitator 24 has a plurality of longitudinally spaced radially arranged fingers 33 on the sleeve 25 the length of the fingers being such the ends 34 thereof, are spaced from the bottom 16 to provide suitable clearance therebetween. The finger 33 that is nearest to the end of wall 12 has the outer portion 35 thereof, bent toward said end wall whereby said outer portion moves in close proximity to the wall and moves closely across an outlet opening 36 centrally located in the lower portion of the end wall 12. The lower edge of the outlet opening 36 is preferably spaced above the bottom 16 as at 37 Fig. 3, whereby metal or other foreign objects of greater specific gravity than the insulation will tend to move in engagement with the bottom and not pass through the outlet 36, the spaced arrangement of the outlet opening with the bottom 16 forming a trap for heavy foreign objects.

The mixing chamber 3 has an inlet opening 38 registering with the outlet opening 36 of the hopper and also has an air inlet 39 adjacent the inlet opening 38 whereby air and insulation pass together through the mixing chamber and to the inlet opening 40 of the impeller apparatus 4. The mixing chamber being between the outlet 36 of the hopper and inlet 40 of the impeller apparatus.

In the particular structure illustrated, the impeller apparatus 4 includes a housing 41 formed of two side portions 42 and 43 having end walls 44 and 45 respectively and inturned peripheral walls 46 which cooperate to form a substantially cylindrical impeller chamber 47. The impeller housing portions 42 and 43 are each provided with outwardly directed annular flanges 48 secured together by suitable fastening devices 49.

The housing portions 42 and 43 are each provided with spaced feet 50 which rest on and are secured to the base 7 by suitable fastening devices in such a manner as to position the axis of the substantially cylindrical impeller chamber 47 horizontally and substantially parallel to the axis of the shaft 26. The impeller housing portions 42 and 43 each have cooperating discharge portions 51 which cooperate to form a substantially tangential discharge passage 52, illustrated as communicating with the impeller chamber 47 substantially at the bottom thereof.

A tube 53 is clamped between the discharge portions 51 and in the passage 52 to form a cylidnrical member on which the hose or duct 5 is connected to form a continuation of the discharge passage.

The impeller inlet opening 40 is preferably axially arranged in the impeller housing end wall 44 and is of suitable size for entry of insulation material and air therethrough around the impeller drive shaft 54 which extends through said inlet opening as later described.

The mixing chamber 3 has an end wall 55, the upper portion of which includes the inlet opening 38, that is adapted to overlie the lower portion of the hopper end wall 12 around the discharge opening 36 therein. The upper and lower ends of the end wall 55 are arcuate and said end wall is of such length that the lower portion thereof is below the inlet opening 40 of the impeller housing. The mixing chamber 3 has a peripheral wall 56 extending from the periphery of the end wall 55 toward the end wall 44 of the impeller housing, said wall 56 terminating in an annular outwardly directed flange 57 engaging the end wall 44 of the impeller housing and secured thereto by suitable fastening devices 58. The lower portion of the mixing chamber is below the lower portion of the impeller housing inlet opening 40, whereby any heavy foreign particles passing through the mixing chamber will drop to the bottom thereof and be trapped whereby such particles will not enter the impeller housing. Some air can enter the mixing chamber from between the end wall 12 of the hopper and the end wall 55 of the mixing chamber. Additional air will enter the air inlet 39, which is illustrated as a continuation of the insulation inlet 38, however the air inlet can be a separate opening near the upper portion of the mixing chamber and of such size as to provide suitable air entry and velocity to substantially suspend the insulation in the air stream. In other words, the air inlet should be sized according to the specific gravity of the insulation and if different insulations are to be used in the blower the air inlet opening in the mixing chamber may be made adjustable by providing a movable closure member to regulate the size of the opening.

A baffle 58' is arranged in the mixing chamber between the mixing chamber inlet opening 38 and the impeller inlet opening 40. The baffle is preferably on the end wall 55 immediately below the mixing chamber inlet opening 38 and extends toward the impeller housing terminating in spaced relation thereto, as illustrated in Fig. 4. The ends of the baffle terminate in spaced relation to the peripheral wall 56 as illustrated in Fig. 6, whereby air and insulation may pass around the baffle in traveling through the mixing chamber. When the discharge of the impeller is stopped or blocked and the operation of the agitator continued, any insulation delivered to the mixing chamber will be supported on the baffle whereby the mixing chamber will not fill and interfere with operation of the apparatus when the impeller discharge is unblocked or started.

The impeller shaft 54 is arranged axially of the impeller chamber 47 and extends through openings 59 and 60 in the end walls 55 and 45 respectively and is rotatably mounted in antifriction bearings 61, preferably of the dust-seal type, suitably mounted on the exteriors of said end walls 55 and 45. An impeller 62 is fixed on the impeller shaft 54 in the impeller housing. The impeller has a flat disk-like portion 63 extending outwardly from one end of a hub 64 and a plurality of spaced blades or vanes 65 substantially perpendicular to the disk portion 63. The blades extend radially from the hub 64 and are curved rearwardly relative to the direction of rotation of the impeller. The impeller is arranged in the housing chamber 47 with the disk portion 63 adjacent to the end wall 45, the blades extending from said disk portion toward the end wall 44. The outer ends of the blades are slightly spaced from the inner surface of the peripheral wall 46 and the edges of the blades and the disk portion are spaced slightly from the end walls 44 and 45 respectively, to provide a suitable operating clearance. However, the spacing is preferably maintained low for maximum efficiency. The impeller is driven by a belt 66 which operatively engages over a drive pulley 67 fixed on the motor armature shaft 31 and a pulley 68 fixed on the impeller shaft 54 as illustrated in Fig. 4.

In operating an insulation blower constructed as described, the motor 6 is energized, rotating the agitator 24 and blower impeller 62. Fibrous insulation is dumped into the hopper extension 19 and said insulation drops into the lower portion of the hoppers 2, the agitator fingers 33 continually stirring same. The rotation of the impeller 63 forms a suction at the inlet opening 40 thereof and said suction acts on the air inlet opening 39 to draw air into the mixing chamber and also acts on the inlet opening 38 which registers with the hopper outlet opening 36.

The curved portion 35 of the finger adjacent the wall 12 moves insulation in close proximity to the outlet opening 36 and the suction acting thereon draws said insulation into the mixing chamber whereby the insulation and the air form a stream passing downwardly through the mixing chamber, through the impeller inlet opening 40 and through centrifugal force created by rotation of the impeller, said insulation and air moving to the periphery of the impeller housing and outwardly through the discharge passage 52 and hose 5. The insulation moving with the air stream, in effect, suspends the insulation whereby said insulation is efficiently blown from the discharge end of the hose. After the insulation is installed the hopper extension 19 is removed from the hopper 2 whereby the entire structure is in two parts for easy moving and transportation.

It is believed obvious I have provided an insulation blower that is economical to manufacture and efficient in operation with few working parts for blowing insulation into building walls and the like.

What I claim and desire to secure by Letters Patent is:

1. In a fibrous insulation blowing machine having a fibrous insulation containing hopper with an end wall provided with an outlet opening adjacent the bottom of the hopper and means for moving the insulation past the outlet opening, and a blower spaced from said hopper wall and having an inlet opening and an outlet connected with a flexible duct for delivering the fibrous insulation to an area of installation; a connection from the hopper to the blower comprising, walls cooperating with the end wall of the hopper and the blower to define a mixing chamber between the hopper and blower having communication with the hopper outlet opening and the blower inlet opening, said communication with the hopper outlet opening being adjacent the upper portion of the mixing chamber and the communication with the blower inlet opening being adjacent the bottom portion of the mixing chamber, and a baffle in the mixing chamber between the hopper outlet opening and the blower inlet opening to support insulation delivered to the mixing chamber during periods when the blower discharge is stopped to prevent filling of said mixing chamber, said mixing chamber having an air inlet in the hopper portion thereof adjacent the hopper outlet opening whereby operation of the blower draws air and insulation into the mixing chamber entraining the insulation in the air in the form of a stream which is drawn into the blower and discharged through the blower outlet and flexible duct connected thereto.

2. In a fibrous insulation blowing machine having a fibrous insulation delivery device with an outlet opening adjacent the bottom thereof, and a blower spaced from the insulation delivery device and having an inlet opening and an outlet connected with a flexible duct for delivery of the fibrous insulation to an area of installation; a connection from the insulation delivery device to the blower comprising, means defining a mixing chamber having communication with the insulation delivery device outlet opening and the blower inlet opening, said communication with the insulation delivery device outlet opening being adjacent the upper portion of the mixing chamber and the communication with the blower inlet opening being adjacent the bottom portion of the mixing chamber, and a baffle in the mixing chamber between the communication with the insulation delivery device outlet opening and the blower inlet opening to support insulation delivered to the mixing chamber during periods when the blower discharge is stopped to prevent filling of said mixing chamber, said mixing chamber having an air inlet opening adjacent the communication with the insulation delivery device outlet opening whereby operation of the blower draws air and insulation into the mixing chamber and effects mixing thereof to entrain the insulation in a stream of air which moves through said mixing chamber into the blower housing and is discharged through the blower outlet and flexible duct connected thereto.

3. In a fibrous insulation blowing machine having a fibrous insulation containing hopper with an end wall provided with an outlet opening adjacent the bottom of the hopper and means for moving the insulation past the outlet opening, and a blower housing spaced from said hopper and wall having the outlet opening and having an impeller rotatable in said housing and an axial inlet opening and a tangential outlet connected with a flexible duct for delivering the fibrous insulation to an area of installation; a connection from the hopper to the blower housing comprising, walls cooperating with the end wall of the hopper and the blower housing to define a mixing chamber between the hopper and blower housing having communication with the hopper outlet opening and the blower housing inlet opening, said communication with the hopper outlet opening being adjacent the upper portion of the mixing chamber and the communication with the blower housing inlet opening being adjacent the bottom portion of the mixing chamber, said mixing chamber having a bottom wall spaced below the lower edge of the blower housing inlet opening to form an abutment tending to prevent heavy foreign particles from passing from the mixing chamber to the blower housing, and a baffle in the mixing chamber between the hopper outlet opening and the blower housing inlet opening to support insulation delivered to the mixing chamber during periods when the blower discharge is stopped to prevent filling of said mixing chamber, said mixing chamber having an air inlet in the upper portion thereof adjacent the hopper outlet opening whereby operation of the blower draws air and insulation into the mixing chamber entraining the insulation in the air in the form of a stream which is drawn into the blower housing and discharged through the blower outlet and flexible duct connected thereto.

References Cited in the file of this patent

UNITED STATES PATENTS

| | | |
|---|---|---|
| 2,194,487 | Thompson | Mar. 26, 1940 |
| 2,220,921 | Thompson | Nov. 12, 1940 |
| 2,517,903 | Luhrmann | Aug. 8, 1950 |
| 2,550,354 | Jacobsen | Apr. 24, 1951 |